(12) United States Patent
Henschel et al.

(10) Patent No.: US 12,095,873 B2
(45) Date of Patent: Sep. 17, 2024

(54) VEHICLE COMPONENT FOR PROVIDING AT LEAST ONE SERVICE IN A VEHICLE, COMPRISING A PREFILTER UNIT

(71) Applicant: HELLA GmbH & Co. KGaA, Lippstadt (DE)

(72) Inventors: Felix Henschel, Unna (DE); Niklas May-Johann, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/888,581

(22) Filed: Aug. 16, 2022

(65) Prior Publication Data

US 2022/0394103 A1 Dec. 8, 2022

Related U.S. Application Data

(63) Continuation of application No. PCT/EP2021/053195, filed on Feb. 10, 2021.

(30) Foreign Application Priority Data

Feb. 19, 2020 (DE) .................. 10 2020 104 408.9

(51) Int. Cl.
*H04L 67/51* (2022.01)
*H04L 67/141* (2022.01)

(52) U.S. Cl.
CPC ............ *H04L 67/51* (2022.05); *H04L 67/141* (2013.01)

(58) Field of Classification Search
CPC .............................. H04L 67/51; H04L 67/141
USPC ........................................................ 709/223
See application file for complete search history.

(56) References Cited

U.S. PATENT DOCUMENTS

| 10,055,260 | B2 | 8/2018 | Teshler et al. |
| 10,191,777 | B2 | 1/2019 | Teshler et al. |
| 10,375,151 | B2 | 8/2019 | Poehnl et al. |
| 11,190,602 | B2 * | 11/2021 | Zong .............. H04L 67/56 |

(Continued)

FOREIGN PATENT DOCUMENTS

| DE | 102015216284 A1 | 3/2017 |
| DE | 102019210229 A1 | 1/2021 |

(Continued)

OTHER PUBLICATIONS

International Search Report dated Apr. 12, 2021 in corresponding application PCT/EP2021/053195.

(Continued)

*Primary Examiner* — Wing F Chan
*Assistant Examiner* — Leon Y Tseng
(74) *Attorney, Agent, or Firm* — Muncy, Geissler, Olds & Lowe, P.C.

(57) ABSTRACT

A vehicle component for providing at least one service in a vehicle, having: a processing unit for carrying out data processing in order to perform the at least one service, a data interface for connection to at least one data transmission network of the vehicle in order to receive and/or transmit data for data processing during performance of the service, and in order to receive a service discovery message for service coordination in the data transmission network, and a prefilter unit for carrying out a relevance test of the received service discovery message in order to forward the service discovery message to the processing unit as a function of the relevance test.

24 Claims, 5 Drawing Sheets

(56) References Cited

U.S. PATENT DOCUMENTS

| | | | |
|---|---|---|---|
| 2009/0306834 A1* | 12/2009 | Hjelm | H04L 67/306 |
| | | | 701/1 |
| 2012/0290749 A1* | 11/2012 | Moench | H04L 67/565 |
| | | | 710/63 |
| 2017/0063971 A1* | 3/2017 | Poehnl | H04L 67/10 |
| 2021/0014340 A1 | 1/2021 | Weber et al. | |
| 2021/0398364 A1 | 12/2021 | Tshache et al. | |

FOREIGN PATENT DOCUMENTS

| | | |
|---|---|---|
| WO | WO2018127790 A2 | 7/2018 |
| WO | WO2020070061 A1 | 4/2020 |

OTHER PUBLICATIONS

Voelker, Lars: "SOME/IP Service Discovery the Need for Service Discovery in the Vehicle" May 27, 2014, XP055791969, pp. 1-13.

\* cited by examiner

VEHICLE COMPONENT FOR PROVIDING AT LEAST ONE SERVICE IN A VEHICLE, COMPRISING A PREFILTER UNIT

This nonprovisional application is a continuation of International Application No. PCT/EP2021/053195, which was filed on Feb. 10, 2021, and which claims priority to German Patent Application No. 10 2020 104 408.9, which was filed in Germany on Feb. 19, 2020, and which are both herein incorporated by reference.

BACKGROUND OF THE INVENTION

Field of the Invention

The present invention relates to a vehicle component and a method for providing at least one service in a vehicle.

Description of the Background Art

It is known from the prior art that vehicle components in a vehicle can be connected to one another by means of a service-oriented architecture (SOA). The document WO 2018/127790 A2, which corresponds to US 2018/0189103, is noted here by way of example, in which the use of an SOA and corresponding services in a vehicle is disclosed. This leads to a change in the communication structure (interfaces and protocols) that enter into the electronic vehicle components. One feature of the SOA is the Service Discovery (SD) service, which is sent through the bus in the SOME/IP (Scalable Service-Oriented Middleware over IP) structure according to AUTOSAR (AUTomotive Open System ARchitecture). SOME/IP is a communication protocol known from the prior art that is used in connection with AUTOSAR. With this "SOME/IP-SD" functionality, it is possible to coordinate flexible services in the network in order to identify and subscribe to desired services. With regard to the specifications of the abovementioned SOME/IP and SOME/IP-SD protocol, refer to the corresponding publicly available documentation (AUTOSAR, "SOME/IP Service Discovery Protocol Specification," 2017).

In the SD protocol, coordination of the services typically takes place through messages (hereinafter also referred to as service discovery messages), which are sent as multicast. This has the result that the messages must be evaluated by most of the control units in the network, even though they may neither offer nor require the corresponding service. This logic is customarily a pure software solution and therefore creates a large workload on the microcontrollers.

SUMMARY OF THE INVENTION

It is therefore an object of the present invention to at least partially overcome the above-described disadvantages. In particular, it is an object of the present invention to reduce the load imposed by evaluation of service discovery messages such as the SD messages.

Features and details that are described in connection with the vehicle component according to the invention also apply in connection with the method according to the invention and vice versa, so mutual reference is or can always be made with regard to the disclosure of the individual aspects of the invention.

In an exemplary embodiment, the object is attained, in particular, by a vehicle component for providing at least one service in a vehicle, wherein the vehicle component can have the following parts: at least one processing unit (in particular electronic), such as a processor, for carrying out data processing in order to perform the at least one service (through the data processing), preferably so that this service can be provided by the vehicle component for other vehicle components of the vehicle that can thus use the service for their own and/or higher-level services, preferably in accordance with the SOA and/or SOME/IP (the latter in particular as an option for integrating the SOA into the control units of the vehicle); at least one data interface (in particular electrical and/or electronic) for connection to at least one data transmission network of the vehicle in order to receive and/or transmit data for data processing during performance of the service, and/or in order to receive (at least) one service discovery message for service coordination (in particular, therefore, coordination in the data transmission network, for example according to the SOA or SOME/IP); and a prefilter unit (in particular electronic) for carrying out a relevance test of the (at least one) received service discovery message, in particular on the basis of a service specification (of the vehicle component) in order to forward the service discovery message to the processing unit as a function of the relevance test.

As a result, the prefilter unit can be upstream of the processing unit in order to test the relevance of the service discovery message for the processing unit even before the processing unit must evaluate the service discovery message. If it is determined here by the prefilter unit that the relevance of the service discovery message is insufficient for the processing unit, the forwarding can be prevented. This has the advantage that the workload of the processing unit can be reduced dramatically. To this end, the prefilter unit can include at least one integrated circuit or be integrated into a microcontroller. Furthermore, the prefilter unit can carry out the relevance test without support from the processing unit—and thus, in particular, independently of the processing unit.

The vehicle component can be implemented, for example, as a control unit or a sensor or an actuator of the vehicle in order to provide one or more vehicle functions. The vehicle is, e.g., a passenger car or a truck, which may, if applicable, include at least one driver assist system and/or an autonomous driving function and/or a radar sensor for monitoring the environment of the vehicle and/or an electronic steering system and/or the like, each of which can be operated by the at least one service. Accordingly, the service can, by way of example, be designed as a radar detection system or as a steering angle determination system or the like. These services can be encapsulated and coordinated through the use of an SOA, which is to say a service-oriented architecture. As a result, the services that are offered by individual vehicle components can be combined into higher services (such as the aforementioned vehicle functions, e.g., a driver assist function). The dynamic integration of services is also possible. A service is thus dynamically linked, which is to say the service need not initially be present during the creation of an application that uses a service (as in the case of the aforementioned vehicle functions). It is not located and integrated until execution. As a result, it is necessary to carry out coordination of the services by means of the service discovery messages. In the data transmission network, the vehicle components that make services are available can have a communication connection with one another. The transmission of the service discovery messages in this data transmission network can take place here as multicast, so that all vehicle components connected to the data transmission network can receive the transmitted service discovery messages and evaluation of the received messages is always provided if applicable. Since this frequent evaluation—in particular in the case of vehicle components—can lead to serious problems with regard to the workload of the vehicle component, the prefilter unit is provided in accordance with the invention. This makes it possible to carry out a relevance test of the service discovery message even without using the processing unit, and thus to contribute to coordination of the services. The processing unit can be implemented as, e.g., a data processing device such as a processor of an electronic arrangement of the vehicle component. The prefilter unit can likewise be an electronic part (which is to say an electronic component such as an arrangement of electronic devices or a separate integrated circuit or a separate part of a microcontroller) of the electronic arrangement of the vehicle component, and can be designed for data processing. Furthermore, the electronic arrangement can have at least one memory with at least one computer program that includes instructions in order to carry out the method according to the invention during execution by the processing unit and/or the prefilter unit.

It can be possible for the data transmission network to be designed to carry out the data transmission by means of SOME/IP, so that the data interface can also be implemented as a SOME/IP interface. As a result, the data interface can serve to enable the use of the vehicle component within an AUTOSAR compliant architecture.

According to the invention, an SOA (service-oriented architecture) can be provided in the vehicle. In this case various control units, sensors, and actuators in the vehicle are networked with one another through the SOA structure. In order to make this possible, the participating electronic vehicle components, which is to say in particular the control units, can support the corresponding interfaces and protocols. In corresponding fashion, the vehicle component according to the invention can also be designed as such a participating electronic vehicle component, in particular as a control unit, that has the data interface to the data transmission network as the interface. The vehicle component according to the invention can thus form one of the clients in the SOA network. So-called find or offer services are used by the clients or by a server in order to locate or offer services, which are stored in the SOA network in a distributed manner. These services are typically carried out in so-called multicast operation, which is to say the message transmission takes place from one point to a group of subscribers (multipoint connection). For the purpose of locating services, service discovery messages that are received by multiple and in particular by all clients are therefore transmitted in the data transmission network. These messages include a service request, which for this purpose includes information about the requested service such as, e.g., a service ID. This in turn now has the result that the corresponding service requests, and also service offers, are also evaluated by subscribers (vehicle components) of the vehicle even though they do not offer or require the corresponding service. This again involves an adverse, heavy workload on the microcontroller. In advantageous fashion, the corresponding request/offer messages can therefore be filtered according to the invention, for example on the basis of data in the header and/or in so-called service entries, and unnecessary further processing can thus be prevented.

It can furthermore be possible that the processing unit is designed to perform the at least one service as part of a service offer of the vehicle component, and/or that the prefilter unit is designed to carry out the relevance test through a comparison of the service discovery message with the service offer in order to forward the service discovery message to the processing unit as a function of the comparison. In the case described, therefore, a service is being sought through the service discovery message. What is involved here is then a find service, so that the corresponding service discovery message can also be referred to as a service request message. The prefilter unit can therefore be understood as an SD filter for the find service. It is also possible, however, that SD filters for the other services (such as offer services) are created using the same structure. Then the comparison by the prefilter unit can be expanded to the effect that the service discovery message (then in the form of a service offer message) is compared with a service query. Both the service query and the service offer can be stored (e.g., in the form of lookup tables) in a service specification.

It can optionally be possible that the data interface is designed to receive the service discovery message in the manner of a service request message for requesting a desired service, and the prefilter unit is designed to forward the service discovery message to the processing unit as a function of the comparison when the requested service is present in the service offer. As a result, another SOA-capable vehicle component can reliably be informed when the desired service is present in order to provide a higher-level service in cooperation with these vehicle components.

Provision can be made that the prefilter unit is designed to forward the service discovery message to the processing unit as a function of the comparison only if the requested service is present in the service offer, and therefore corresponds to the at least one service provided by the vehicle component. Consequently, a significant reduction in the workload for the processing unit can take place.

The invention can advantageously provide that the prefilter unit and the processing unit are implemented as separate electronic components of an electronic arrangement of the vehicle component. This hardware separation makes it possible to reliably reduce the load on the processing unit.

Preferably, it can be provided that the prefilter unit and the processing unit are integrated together on a printed circuit board of the vehicle component, in particular in a shared microcontroller. Consequently, the electronic arrangement can be provided as a compact and easy-to-install electronic assembly for the vehicle component.

Provision can be made that the processing unit is implemented in the form of a processor, and/or the prefilter unit is implemented in the form of a dedicated circuit designed for the relevance test and the forwarding. Consequently, the prefilter unit can reliably carry out the prefiltering of the service discovery messages.

The invention can provide that the data transmission network is implemented as a network for an SOA. It is likewise possible for the data interface to be designed as a service-oriented interface in order to establish the connection to the data transmission network. As an example, the data interface can be implemented as an Ethernet interface for this purpose.

Provision can preferably be made that the data transmission network can be implemented as an Ethernet. This means that the data interface can be designed to establish the connection to the data transmission network in the form of the Ethernet, so that the data interface can be implemented as an Ethernet interface. Alternatively or in addition, it is possible that the data transmission network is implemented as a CAN bus system (Controller Area Network bus system). This means that the data interface can be designed to establish the connection to the data transmission network in the form of the CAN bus system, so that the data interface can be implemented as a CAN bus interface.

In addition, it can be advantageous that the prefilter unit can be designed to evaluate a data structure corresponding to an SOA of the vehicle in the service discovery message in order to carry out the relevance test. The data structure specifies, for example, the position at which the service-specific field that has information about a desired service is located. The comparison for the relevance test can thus take place on the basis of this information.

It is additionally advantageous when the vehicle component and/or the processing unit is designed to provide the service as a service within an SOA of the vehicle. The vehicle component can thus be SOA-suitable in order to enable flexible and dynamic provision of services in the vehicle.

It can be beneficial when the prefilter unit is implemented within the scope of the invention as an ASIC (application-specific integrated circuit) or an FPGA (Field Programmable Gate Array) or an SOA adapter for the vehicle component. As a result, the processing unit, for example in the form of a processor, can reliably be relieved of work.

The subject matter of the invention is likewise a method for providing at least one service in a vehicle. Provision is made here that the following steps are carried out, preferably sequentially or in any desired order, wherein individual and/or all steps can also be repeated: Carrying out a data processing by a processing unit of a vehicle component (of the vehicle), in order to perform the at least one service; Providing a connection to a data transmission network of the vehicle by a data interface of the vehicle component in order to receive and/or transmit data for data processing during performance of the service, and/or in order to receive a service discovery message for service coordination in the data transmission network; and Carrying out a relevance test of the received service discovery message, in particular on the basis of a service specification, by a prefilter unit of the vehicle component in order to forward the service discovery message to the processing unit as a function of the relevance test.

As a result, the method according to the invention provides the same advantages as have been described in detail with respect to a vehicle component according to the invention. Moreover, the vehicle component used with the method according to the invention can be implemented as a vehicle component according to the invention.

It is also optionally possible that the performance of the relevance test includes the following steps: Carrying out a data extraction of the data in the received service discovery message, preferably as a function of an SOA data structure, preferably according to SOME/IP, especially preferably from a SOME/IP header according to AUTOSAR; Carrying out a check of the message type of the service discovery message on the basis of the extracted data, in particular from a Message ID field of the SOME/IP header; Carrying out an extraction of at least one service-specific field of the service discovery message, in particular of the Find Service entry of the SOME/IP header; Carrying out a comparison of at least one content of the service-specific field having a content of the service specification, wherein the service specification can include information about a service offer and/or from a service query of the vehicle component; and Carrying out the forwarding of the service discovery message as a function of the comparison.

This has the advantage that the relevant messages can be reliably separated from the non-relevant messages in order to filter out the non-relevant messages. In concrete terms, the data can be extracted according to a SOME/IP protocol during data extraction. The check of the message type can take place in a manner so as to check that the service discovery message is indeed such a message, such as a SOME/IP-SD (Service Discovery) message. With this functionality (such as SOME/IP-SD), it is possible to identify and, if applicable, to subscribe to flexible services in the data transmission network. So that a client such as the vehicle component knows what services are currently available, SOME/IP-SD provides two mechanisms that permit the dynamic discovery of services. An Offer Service allows the server to offer in the network all the services it offers. The "Find Service" instead allows the clients to ask for available services, which are then stored for the vehicle component, e.g., in the service query.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
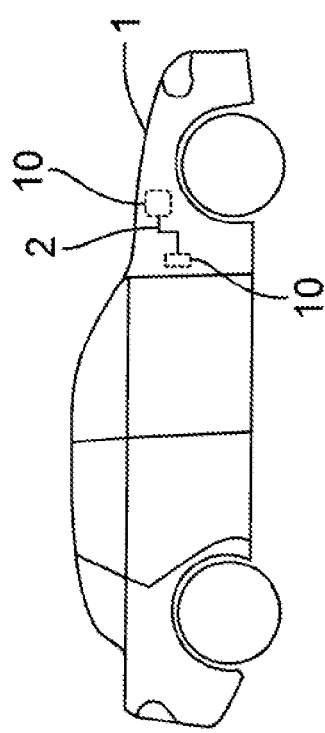
FIG. 1 is a schematic representation of two vehicle components according to the invention in a vehicle.
Figure 2:
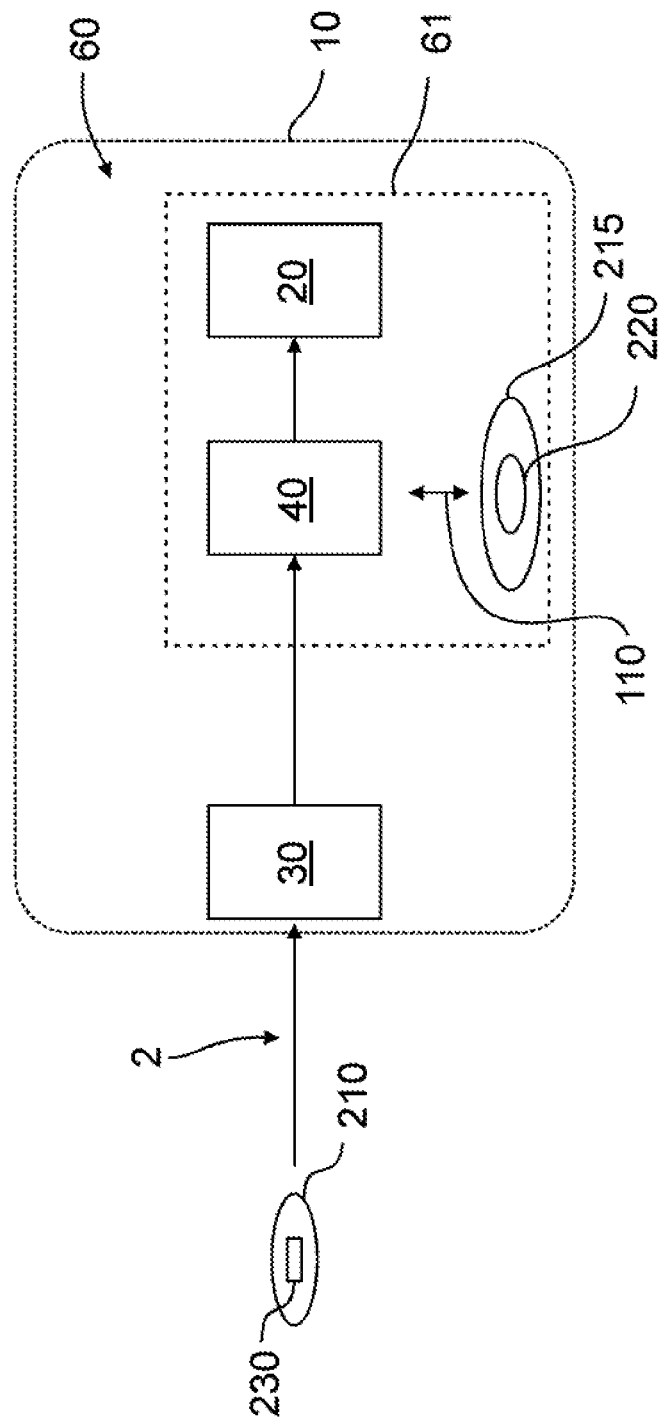
FIG. 2 is a schematic representation of a vehicle component according to the invention.
Figure 3:
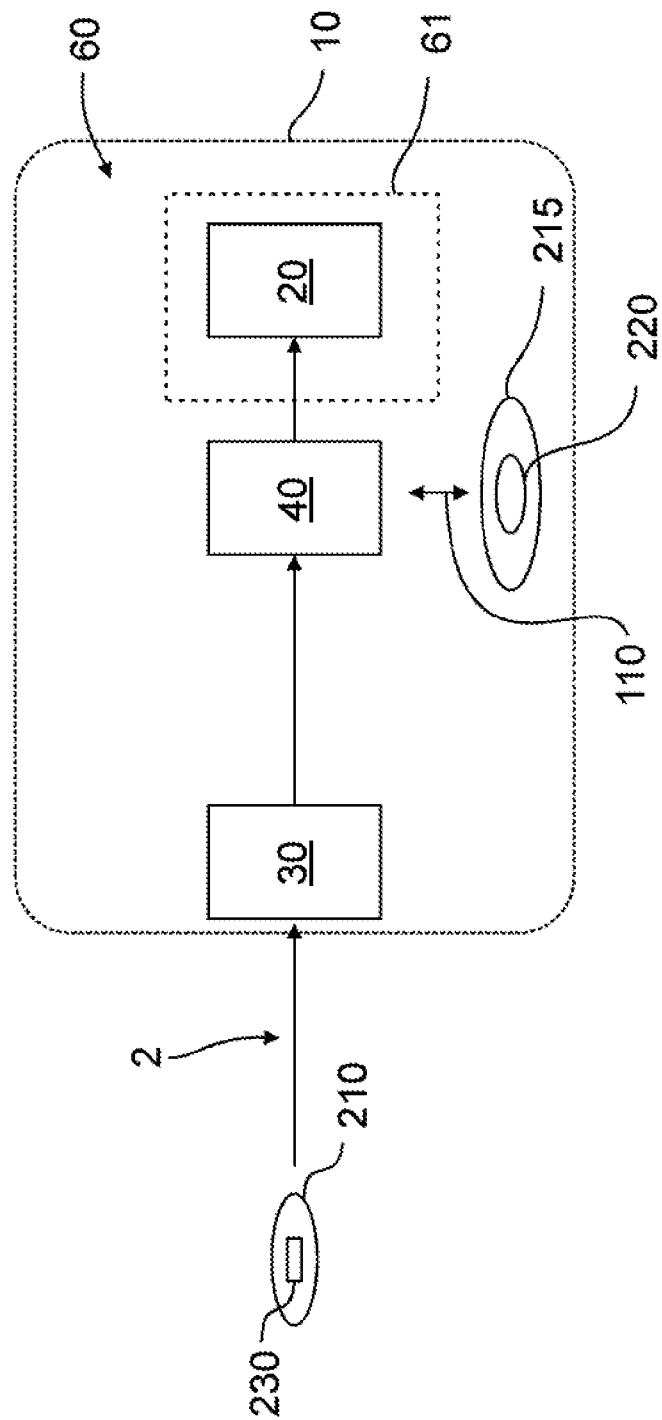
FIG. 3 is another schematic representation of a vehicle component according to the invention.
Figure 4:
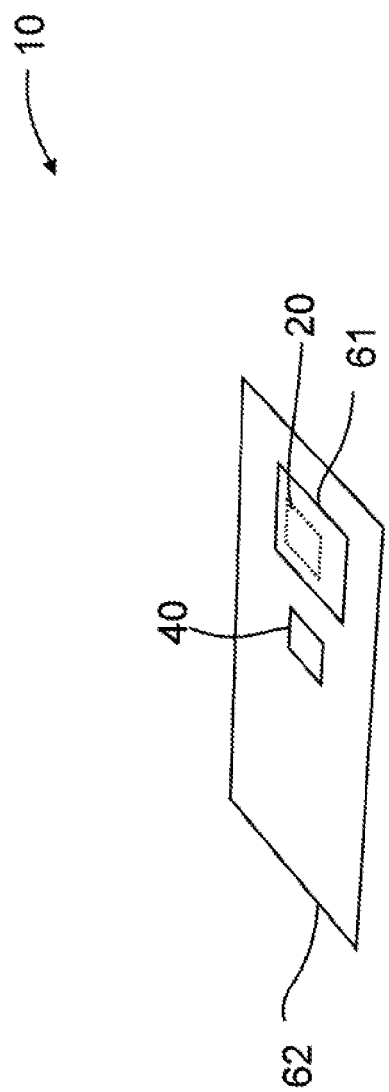
FIG. 4 is a schematic representation of a printed circuit board of a vehicle component according to the invention.

Two vehicle components 10 according to the invention for providing at least one service in a vehicle 1 are shown by way of example in FIG. 1, and one thereof is shown by way of example in each of FIGS. 2 to 4. The vehicle components 10 represented in FIG. 1 can offer different services in this context, and can thus also be implemented differently. In like manner, however, the vehicle components 10 according to FIGS. 1 to 4 can have at least one processing unit 20 for carrying out data processing in order to perform the at least one service provided. Furthermore, a data interface 30 can be provided for connection to a data transmission network 2 of the vehicle 1 in order to receive and/or transmit data for data processing during performance of the service, and in order to receive a service discovery message 210 for service coordination in the data transmission network 2.

A particular feature of the invention is the use of a prefilter unit 40 in the vehicle components. This unit serves to carry out a relevance test 110 of the received service discovery message 210 in order to forward the service discovery message 210 to the processing unit 20 as a function of the relevance test 110. As a result, it is possible to reduce the load on the processing unit 20, which otherwise would have to evaluate a potentially very high number of service discovery messages 210 itself, even if these messages had no relevance to the service provided.

The processing unit 20 can be designed to perform the at least one service as part of a service offer 220 of the vehicle component 10, wherein the prefilter unit 40 can be designed to carry out the relevance test 110 through a comparison 150 of the service discovery message 210 with the service offer 220 in order to forward the service discovery message 210 to the processing unit 20 as a function of the comparison 150. In addition, the data interface 30 can be designed to receive the service discovery message 210 in the manner of a service request message 210 for requesting a desired service, wherein the prefilter unit 40 is designed to forward the service discovery message 210 as a function of the comparison 150 to the processing unit 20 if the requested service is present in the service offer 220. The service discovery message 210 in this case can be forwarded to the processing unit 20 as a function of the comparison 150 only if the requested service is present in the service offer 220, and therefore corresponds to the at least one service provided by the vehicle component 10.

As is shown in FIGS. 2 to 4, the prefilter unit 40 and the processing unit 20 can be implemented as separate electronic components of an electronic arrangement 60 of the vehicle component 10. Nonetheless, according to FIG. 4 the prefilter unit 40 and the processing unit 20 can be arranged together on a printed circuit board 62 of the vehicle component 10. In the example shown in FIGS. 3 and 4, the prefilter unit 40 and the processing unit 20 are arranged such that they are physically separated and spaced apart, and are electrically connected as necessary solely by conductive traces. Alternatively, provision is made according to FIG. 2 that the prefilter unit 40 and the processing unit 20 are integrated in a shared microcontroller 61. Nevertheless, this example also involves separate components that can each perform the data processing independently. It is especially advantageous when the prefilter unit 40, in contrast to the processing unit 20, is implemented in the form of a dedicated circuit designed for the relevance test 110 and the forwarding.

Figure 5:
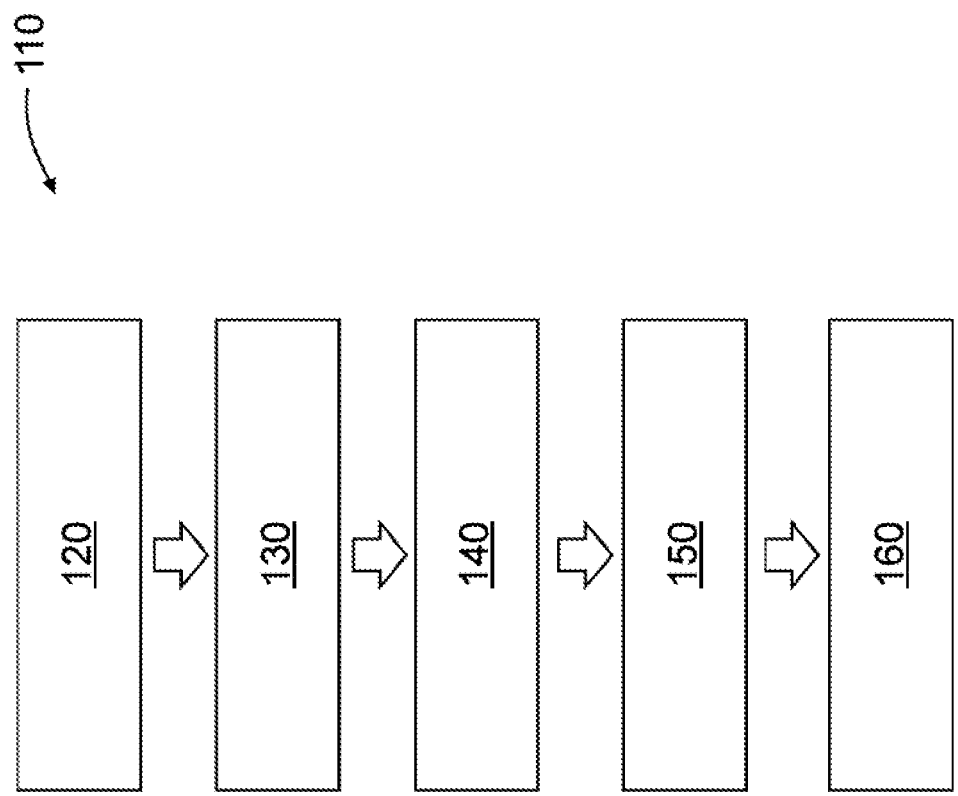
FIG. 5 is a schematic representation for visualizing a method according to the invention.

A method according to the invention is represented in FIG. 5 with additional details. In this case, the performance of the relevance test 110 can include the following steps: Carrying out a data extraction 120 of the data in the received service discovery message 210; Carrying out a check 130 of the message type of the service discovery message 210 on the basis of the extracted data; Carrying out an extraction 140 of a service-specific field 230 of the service discovery message 210; Carrying out a comparison 150 of a content of the service-specific field 230 having a content of a service specification 215, which includes at least one item of information about a service offer 220 of the vehicle component 10; and Carrying out the forwarding 160 of the service discovery message 210 as a function of the comparison 150.

According to the check 130, the data in the SOME/IP header that define whether or not the message received generally involves a service discovery message 210 (SOME/IP-SD message) can be evaluated, for example. This can be used as an initial indicator in order to filter for "SD Messages." Moreover, the "Service Entries" (e.g., Offer, Find, . . . ) can also be evaluated during the extraction 140. The service-specific field 230 can include, for example, the "Find Service Entry" field, which in turn can include multiple fields. They can define the service sought. These fields can be evaluated by the prefilter unit 40 at the hardware level. In concrete terms, the "Type" and "Service ID" fields of the service-specific field 230 can then be compared with the supported services of the vehicle component 10 in the service specification 215 during the comparison 150. With these two fields, a majority of the non-relevant requests are already filtered out. Only in the case of a match can the service discovery message 210 be forwarded to the downstream evaluation logic—which is to say the processing unit 20. Additional relevant fields from the "Find Service Entry" can optionally also be considered in the comparison. Examples of these are Instance ID, Major Version, and Minor Version. Additional SD filters can be created for the other services (Offer, . . . ) using the same structure.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle component for providing at least one service in a vehicle, the vehicle component comprising:
    a processor to carry out data processing in order to perform the at least one service;
    a data interface to connect to at least one data transmission network of the vehicle in order to receive and/or transmit data for data processing during performance of the service, and in order to receive a service discovery message for service coordination in the data transmission network; and
    a prefilter to carry out a relevance test of the received service discovery message in order to forward the service discovery message to the processor as a function of the relevance test, said relevance test comprising extracting data in the received service discovery message as a function of a service-oriented architecture (SOA) data structure.

2. The vehicle component according to claim 1, wherein the processor is designed to perform the at least one service as part of a service offer of the vehicle component, and
    wherein the prefilter is designed to carry out the relevance test through a comparison of the service discovery message with the service offer in order to forward the service discovery message to the processor as a function of the comparison.

3. The vehicle component according to claim 2, wherein the data interface is designed to receive the service discovery message in a manner of a service request message for requesting a desired service, and the prefilter is designed to forward the service discovery message as a function of the comparison to the processor when the requested service is present in the service offer.

4. The vehicle component according to claim 3, wherein the prefilter is designed to forward the service discovery message to the processor as a function of the comparison only if the requested service is present in the service offer and therefore corresponds to the at least one service provided by the vehicle component.

5. The vehicle component according to claim 2, wherein the at least one service is coordinated through use of the service oriented architecture (SOA) and can be dynamically integrated into the vehicle.

6. The vehicle component according to claim 1, wherein the prefilter and the processor are implemented as separate electronic components of an electronic arrangement of the vehicle component.

7. The vehicle component according to claim 1, wherein the prefilter and the processor are integrated together on a printed circuit board of the vehicle component or in a shared microcontroller.

8. The vehicle component according to claim 1, wherein the processor is implemented in the form of a processor, and the prefilter is implemented in the form of a dedicated circuit designed for the relevance test and the forwarding.

9. The vehicle component according to claim 1, wherein the data interface is designed as a service-oriented interface in order to establish the connection to the data transmission network.

10. The vehicle component according to claim 1, wherein the data interface is designed as an Ethernet interface in order to establish the connection to the data transmission network in the form of an Ethernet.

11. The vehicle component according to claim 1, wherein the prefilter is designed to evaluate a data structure corresponding to the SOA of the vehicle in the service discovery message in order to carry out the relevance test.

12. The vehicle component according to claim 1, wherein the vehicle component and/or the processor is designed to provide the service as a service within the SOA of the vehicle.

13. The vehicle component according to claim 1, wherein the prefilter is implemented as an application-specific integrated circuit (ASIC) or a field programmable gate array (FPGA) or a service oriented architecture (SOA) adapter for the vehicle component.

14. The vehicle component according to claim 1, wherein the prefilter is upstream of the processor such that the prefilter tests the relevance of the service discovery message before the processor must evaluate the service discovery message.

15. The vehicle component according to claim 1, wherein if the prefilter determines that the relevance of the service discovery message is insufficient, then the service discovery message is not forwarded to the processor.

16. The vehicle component according to claim 1, wherein the prefilter evaluates the relevance of the service discovery message independent of the processor.

17. The vehicle component according to claim 1, wherein the vehicle component is a control unit, a sensor or an actuator of the vehicle configured to provide a vehicle function.

18. The vehicle component according to claim 1, wherein the prefilter and the processor are configured to be connected as separate electronic components of an electronic arrangement of the vehicle component.

19. A method for providing at least one service in a vehicle, the method comprising:
  carrying out a data processing by a processor of a vehicle component in order to perform the at least one service;
  providing a connection to at least one data transmission network of the vehicle by a data interface of the vehicle component in order to receive and/or transmit data for data processing during performance of the service, and in order to receive a service discovery message for service coordination in the data transmission network; and
  carrying out a relevance test of the received service discovery message by a prefilter in order to forward the service discovery message to the processor as a function of the relevance test, said carrying out the relevance test comprising extracting data in the received service discovery message as a function of a service-oriented architecture (SOA) data structure.

20. The method according to claim 19, wherein said carrying out the relevance test further comprises:
  carrying out a check of the message type of the service discovery message on the basis of the extracted data;
  carrying out an extraction of at least one service-specific field of the service discovery message;
  carrying out a comparison of at least one content of the service-specific field having a content of a service specification; and
  carrying out the forwarding of the service discovery message as a function of the comparison.

21. The method according to claim 19, wherein the vehicle component comprises:
  a processor to carry out data processing in order to perform the at least one service;
  a data interface to connect to at least one data transmission network of the vehicle in order to receive and/or transmit data for data processing during performance of the service, and in order to receive a service discovery message for service coordination in the data transmission network; and
  a prefilter to carrying out a relevance test of the received service discovery message in order to forward the service discovery message to the processor as a function of the relevance test.

22. The method according to claim 19, wherein said SOA data structure is a Scalable Service-Oriented Middleware over IP (SOME/IP) structure.

23. The method according to claim 19, wherein said carrying out the relevance test further comprises carrying out a check of the message type of the service discovery message on the basis of the extracted data from a Message ID field of a Scalable Service-Oriented Middleware over IP (SOME/IP) header.

24. The method according to claim 19, wherein said carrying out the relevance test further comprises:
  carrying out a check of the message type of the service discovery message on the basis of the extracted data from a Message ID field of a Scalable Service-Oriented Middleware over IP (SOME/IP) header;
  carrying out an extraction of a find service entry of the SOME/IP header;
  carrying out a comparison of at least one content of the service-specific field having a content of a service specification; and
  carrying out the forwarding of the service discovery message as a function of the comparison.

* * * * *